Figure 1:
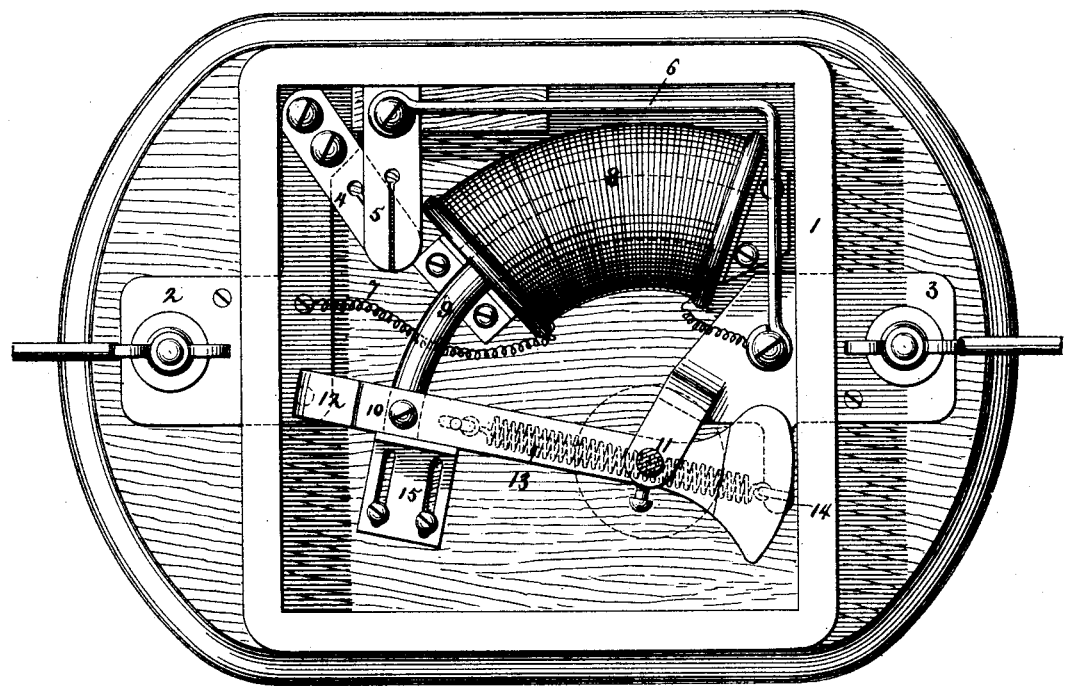

(No Model.) 2 Sheets—Sheet 1.

S. S. WHEELER.
AUTOMATIC CUT-OUT FOR ELECTRIC MOTORS.

No. 464,948. Patented Dec. 8, 1891.

Witnesses
Geo. W. Breck
Sidney L. Johnson

Inventor
S. S. Wheeler
By his Attorneys
Foster & Freeman (No Model.) 2 Sheets—Sheet 2.

S. S. WHEELER.
AUTOMATIC CUT-OUT FOR ELECTRIC MOTORS.

No. 464,948. Patented Dec. 8, 1891.

Witnesses
Geo. W. Breck
Sidney S. Johnson

Inventor
S. S. Wheeler
By his Attorneys
Foster & Freeman

UNITED STATES PATENT OFFICE.

SCHUYLER S. WHEELER, OF NEW YORK, N. Y.

AUTOMATIC CUT-OUT FOR ELECTRIC MOTORS.

SPECIFICATION forming part of Letters Patent No. 464,948, dated December 8, 1891.

Application filed July 16, 1887. Serial No. 244,525. (No model.)

*To all whom it may concern:*

Be it known that I, SCHUYLER S. WHEELER, a citizen of the United States, residing in New York city, in the county and State of New York, have invented certain new and useful Improvements in Automatic Cut-Outs for Electric Motors, of which the following is a specification.

My invention relates to automatic cut-outs for electromotors; and it consists in a cut-out controlling the connection of a motor or other apparatus to a circuit, and so wound or arranged that it will automatically disconnect the motor from the circuit upon the occurrence of any given undesirable condition of running or will allow it to remain connected only as long as the desired conditions of running are maintained.

It is well known that when an electro-magnetic motor is included in an electric circuit it develops a counter electro-motive force to that of the generator which furnishes the current.

My invention consists in combining with the motor apparatus which will be operated by any excessive variation of this counter electro-motive force and disconnect the motor. Assuming the strength of current from the generator to remain practically constant, the counter electro-motive force produced by the motor will be determined by its speed, and if the work of the motor is suddenly reduced—as, for example, by the slipping off or parting of the belt—its speed and its counter electro-motive force will consequently rise, and this running away will be cumulative, since on constant current the faster it runs the more power it will have.

Electro-magnetic motors on series circuits are liable from various causes to run away, so that they will produce too much counter electro-motive force, or, in other words, absorb and convert too much of the line-current into power. The power developed will increase much more rapidly than the friction of rotation, and the result will inevitably be the wrecking of the apparatus. Under such circumstances it becomes necessary to provide some means by which the abnormal motor will be cut out of the circuit automatically, so that the remaining motors or translating devices may still be operated.

The primary object of my invention is to provide such an automatic cut-out that will permit of the use of electro-magnetic motors in series circuit without danger of interfering with other motors or translating devices included in the same circuit if from any cause the motor becomes abnormal in its operation. In using electro-magnetic motors or other translating devices on multiple-arc circuits, if anything happens to one of the translating devices to prevent further trouble it is only necessary to break the branch circuit containing such translating device and the remaining translating devices will operate as before; but when the motor is used in a series circuit some means must be provided whereby the circuit will remain complete or unbroken notwithstanding the motor is removed from said circuit. Again, when a motor speeds up on a multiple-arc circuit its own increasing electro-motive force stops the current more and more completely, so that at a very high speed it will receive no current. It is thus to a degree its own governor. This is entirely the reverse of the case on a series circuit, where the greater the speed the greater the power of the motor.

To overcome this, part of my invention may be stated to broadly consist in the combination, with a series circuit, of an electro-magnetic motor and a branch or shunt circuit of high resistance and sensitive to the electro-motive force generated by the motor and means connected with said circuits whereby the motor may be cut out of circuit without breaking the continuity thereof and without interfering with the operation of other translating devices included therein when the power absorbed or developed by the motor exceeds the desired limit.

My invention further consists in the application of this broad idea by means of special devices substantially as are pointed out hereinafter.

It is evident that my invention furnishes a partial power-meter, inasmuch as the person supplying the current is assured that the motor can at no time exceed the amount of power contracted for.

Figure 2:
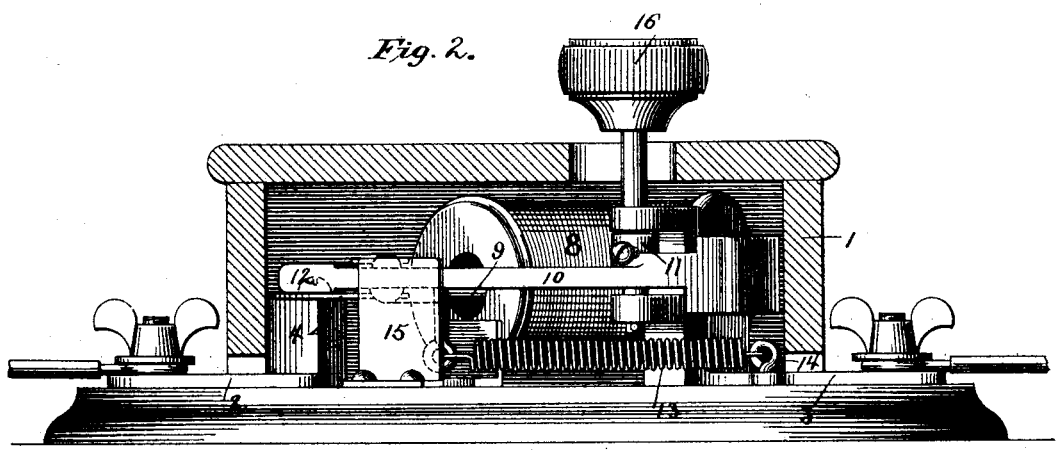
Figure 3:
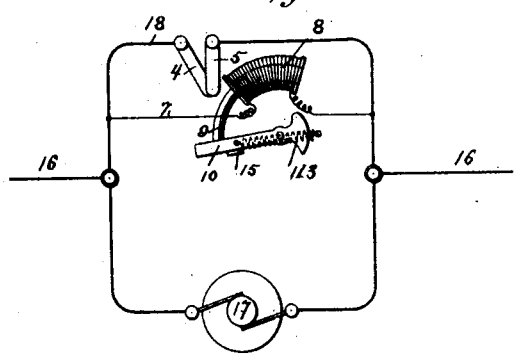
Figure 4:
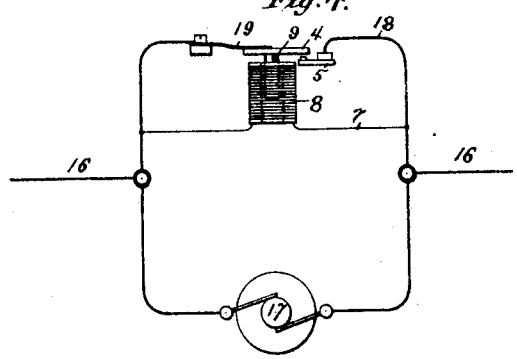
Figure 5:
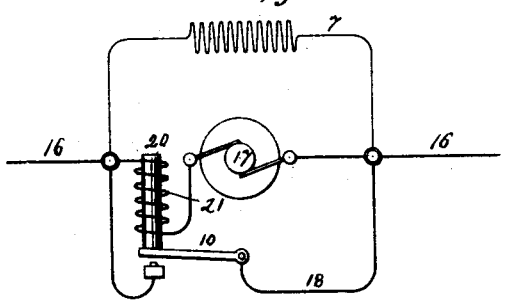
Figure 6:
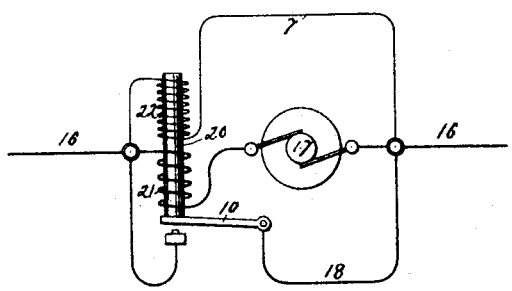
Figure 7:
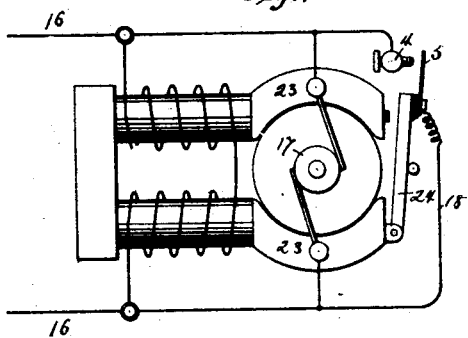
Figure 8:
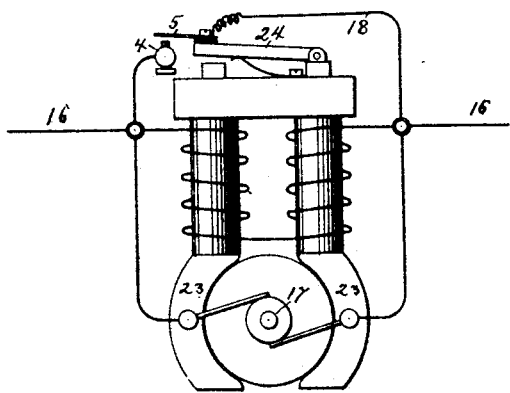

Figure 1 is a plan view of one form of a cut-out. Fig. 2 is a side view, partly in section, of the same. Fig. 3 is a diagram illustrating the application of such a cut-out to a motor-circuit. Fig. 4 is a diagram representing another form of cut-out in which the circuit is completed through the motor again whenever the abnormal counter electro-motive force therein is overcome. Fig. 5 is a diagram representing another arrangement of the cut-out which is automatically held open by the normal current flowing through the motor. Fig. 6 represents a similar cut-out operated on the differential principle, and Figs. 7 and 8 represent cut-outs in which the field-magnets of the motor serve to operate the cut-out.

While various forms of cut-outs may be used without departing from the principles of my invention, I have shown in Figs. 1 and 2 a form of cut-out which I have found to be exceedingly useful and advantageous, and which consists, essentially, in a box or frame 1, having binding-posts 2 and 3, to which the terminals of the circuit are connected. Connected to one of these binding-posts is one member of a normally-open switch, (represented as a spring contact-piece 4,) and another similar contact-piece 5 is connected by a wire 6 to the other binding-post 3. These binding-posts are also connected by a circuit 7 of high resistance including the coils 8 of the solenoid, which in this instance is shown as formed in an arc shape, the similar-shaped core 9 of which is attached to a lever or contact-arm 10, pivoted at 11 to an extension of the binding post or plate 3. This arm 10 may be entirely of conducting material, though I prefer to insulate the head 12 from the body portion thereof and to so form the head that it will impinge upon or slide between the spring contact-pieces 4 and 5 and complete the circuit around the solenoid or coil 8. Connected to this contact-arm 10 is a suitable retracting device or spring 13, the other end of which is connected to some stationary portion of the cut-out, as the lug 14, and an adjusting device 15 is so arranged that the position of the contact-arm bearing against the same is such that the spring 13 normally tends to hold the arm in the position shown in Fig. 1, but out of contact with the spring contact-pieces 4 and 5. By this arrangement the contact-arm may be so adjusted that the current passing through the coils of the solenoid 8 may vary within certain limits without moving the core 9, attached to said arm; but when the current passing through the solenoid increases above certain limits it will attract the core 9 sufficiently to draw the contact-arm 10 toward the solenoid, allowing the core to enter the coil to a greater extent, and by this means the attraction upon the core increases in a manner well understood. At the same time the moment the arm moves sufficiently to cause the spring to pass the fulcrum of the arm the spring acts to assist the solenoid and to accelerate the movement of the arm, so that the shunt-circuit, through the contacts 4 and 5, will be instantly closed. Not only does the spring assist in closing said contact as soon as the arm is carried past the center, but the moment the core and lever are started from the back-stop they will fly shut, since the leverage of the retracted spring is reduced with the slightest movement. When this shunt-circuit is closed, almost the entire current will flow therethrough, owing to the difference in resistance between such shunt-circuit and the high-resistance-solenoid circuit, and the tendency would be for the contact-arm to fly away or to make bad contact and perhaps set up a rheotomic action; but the spring, being arranged in the manner set forth, not only serves to prevent the completing of the shunt-circuit until the current flowing through the solenoid has reached the desired point, but also serves to maintain the shunt-circuit when once completed as well as to aid in the rapid closure of the shunt when once the contact-arm begins to move, as the effect of the spring increases as its leverage on the arm is reduced. A suitable handle 16 may be attached to the contact-lever to operate it by hand, either in opening or closing the shunt-circuit.

Referring to Fig. 3, I have represented diagrammatically a series circuit 16, including an electro-magnetic motor 17 and having an open shunt-circuit 18 including contact-pieces 4 and 5, and in a high-resistance shunt 7 is shown a cut-out consisting in the present instance of a solenoid 8, the core 9 of which is attached to a contact-arm 10, resting against the adjusting device 15 and controlled by the spring 16. The operation of this arrangement will be readily understood from the above. Normally almost all of the current passes through the motor and only a slight proportion through the high-resistance shunt, including the solenoid, and not sufficient to operate the cut-out. When, however, from any cause the opposition to the current flowing through the motor becomes abnormal, either through the counter electro-motive force or otherwise, more current passes through the high-resistance shunt and operates to move the contact-arm to close the contacts 4 and 5 and shunt the circuit around the motor, so that the continuity of the series circuit will not be interrupted under any consideration.

In Fig. 4 I have illustrated the application of a different cut-out, in which the solenoid 8 is included in the high-resistance circuit 7, as before, and the core 9 thereof is attached to a spring-arm 19, which normally holds the contacts 4 and 5 open; but when the current through the solenoid increases the core is attracted and the contacts are momentarily closed, completing the shunt-circuit 18. This arrangement momentarily reduces the current flowing through the motor and allows it to adjust itself so as to properly utilize the current flowing therethrough, and when this result is obtained the shunt 18 is automatically maintained open.

In Fig. 5 I have shown the shunt-circuit 18 normally held open by a core 20, included in a coil 21 in the main circuit of the motor, and when the resistance of the motor abnormally increases less current flows through the coils 21, surrounding said core, and the shunt 18 is automatically closed. In Fig. 6 I have shown a similar arrangement of the core 20 included in the coil 21 of the main circuit, and the high-resistance shunt 7 also surrounds the core, the coils 22 thereof being wound in a direction opposite to the coil 20, so that whenever the resistance of circuit of the armature of the motor is abnormal not only will the attraction by the core of the contact-arm 10 decrease, but the increased current flowing through the high-resistance shunt will tend to reverse the polarity of the core and force the contact-arm away therefrom and complete the shunt 18.

In Fig. 7 I have shown another application of my cut-out, in which the field-magnets 23 and the armature of the motor 17 are included in multiple-arc circuit, while the shunt 18 is operated by a lever 24, one end of which is pivoted to one of the field-magnets and is attracted by the other, so as to close the contacts 4 and 5 whenever the resistance in the armature of the motor is abnormal, as under such circumstances a greater proportion of current will flow through the branch including the field-magnets, increasing the magnetic attraction of said magnets for their armature or the contact-arm 24. In Fig. 8 is shown a similar arrangement to that shown in Fig. 7, except that the armature or contact-arm 24 is pivoted to the neutral or yoke piece of the field-magnets, and the operation of this arrangement is substantially the same as that of the device shown in Fig. 7.

It will be seen from the above that in all cases when the resistance or opposing electromotive force in the circuit passing through the motor becomes abnormally great, so that it would be liable to interfere with other motors or translating devices in the same circuit, the motor is automatically short-circuited and the series circuit completed around the motor, and in some instances, where the motor of its own accord can assume the proper resistance, it is automatically cut into circuit again, while in others the circuit has to be completed by the aid of an attendant; but in any event the main series circuit is not interrupted.

It will be evident to those skilled in the art that various modifications and arrangements of my invention other than those described may be made without departing from the broad principle; and without limiting myself to the special construction and arrangement shown what I claim is—

1. A cut-out for electromotors, consisting of a normally-open low-resistance shunt, a high-resistance shunt including the coils of a solenoid, a contact-arm connected to the solenoid, means for adjusting the contact-arm, and a spring connected to the arm, so that it will normally hold it away from the solenoid, but operates to assist the solenoid when the arm is moved, substantially as described.

2. A cut-out for electromotors, consisting of a normally-open low-resistance shunt, a high-resistance shunt, a contact-arm controlling the low-resistance shunt, and a magnet operating on said contact-arm when the motor produces an excessive counter electro-motive force and releasing the arm when the counter electro-motive force falls to normal, substantially as described.

In testimony whereof I have signed my name to this specification in the presence of two subscribing witnesses.

SCHUYLER S. WHEELER.

Witnesses:
GEORGE E. GUERRIER,
D. O. SMITH.